United States Patent
Kanzaki

(10) Patent No.: US 9,951,172 B2
(45) Date of Patent: Apr. 24, 2018

(54) POLYURETHANE FOAM

(71) Applicant: BRIDGESTONE CORPORATION, Tokyo (JP)

(72) Inventor: Shinya Kanzaki, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/116,844

(22) PCT Filed: Jan. 8, 2015

(86) PCT No.: PCT/JP2015/050354
§ 371 (c)(1),
(2) Date: Aug. 5, 2016

(87) PCT Pub. No.: WO2015/118899
PCT Pub. Date: Aug. 13, 2015

(65) Prior Publication Data
US 2017/0114178 A1 Apr. 27, 2017

(30) Foreign Application Priority Data
Feb. 7, 2014 (JP) ................................ 2014-022044

(51) Int. Cl.
| C08G 18/08 | (2006.01) |
| C08G 18/18 | (2006.01) |
| C08G 18/66 | (2006.01) |
| C08G 18/76 | (2006.01) |
| C09K 3/12 | (2006.01) |
| C08G 101/00 | (2006.01) |

(52) U.S. Cl.
CPC ......... *C08G 18/14* (2013.01); *C08G 18/1808* (2013.01); *C08G 18/1833* (2013.01); *C08G 18/6677* (2013.01); *C08G 18/7621* (2013.01); *C09K 3/12* (2013.01); *C08G 2101/00* (2013.01)

(58) Field of Classification Search
CPC ................ C08G 18/14; C08G 18/1808; C08G 18/1833; C08G 18/6677; C08G 18/7621; C08G 2101/00; C09K 3/12
See application file for complete search history.

(56) References Cited

U.S. PATENT DOCUMENTS

| 5,686,500 A * | 11/1997 | Fishback .............. C08G 18/165 |
| | | 521/128 |
| 2013/0225705 A1* | 8/2013 | Plaver ................ C08G 18/4841 |
| | | 521/106 |
| 2013/0237622 A1* | 9/2013 | Wujcik .................. C08L 71/02 |
| | | 521/108 |

FOREIGN PATENT DOCUMENTS

| JP | 2002-338944 A | 11/2002 |
| JP | 2007-56212 A | 3/2007 |
| JP | 2009-167285 A | 7/2009 |
| JP | 2009-173806 A | 8/2009 |
| JP | 2011-184502 A | 9/2011 |
| JP | 2012-116900 A | 6/2012 |

OTHER PUBLICATIONS

International Search Report for PCT/JP2015/050354 dated Feb. 10, 2015 [PCT/ISA/210].

* cited by examiner

*Primary Examiner* — John Cooney
(74) *Attorney, Agent, or Firm* — Sughrue Mion, PLLC

(57) ABSTRACT

Using general purpose raw materials, a polyurethane foam having higher water stopping properties than conventional ones is provided. The polyurethane foam is a polyurethane foam obtained by foaming and curing a composition containing a polyol component, an isocyanate component, a foam stabilizer, a cross-linking agent, and a catalyst.

4 Claims, 1 Drawing Sheet

POLYURETHANE FOAM

CROSS REFERENCE TO RELATED APPLICATIONS

This application is a National Stage of International Application No. PCT/JP2015/050354, filed on Jan. 8, 2015, which claims priority from Japanese Patent Application No. 2014-022044, filed on Feb. 7, 2014, the contents of all of which are incorporated herein by reference in their entirety.

TECHNICAL FIELD

The present invention relates to a polyurethane foam which can be used as water stopping sealing material in the fields of automobile, housing, building, civil engineering, and consumer electronics, etc., particularly to a polyurethane foam having higher water stopping properties than conventional ones.

BACKGROUND ART

Polyurethane foams have been conventionally used as water stopping sealing material in the fields of automobile, housing, building, civil engineering, and consumer electronics, etc. For example, in Patent Literature 1, in order to provide a water stopping polyurethane foam which can stably achieve high water stopping performance even having a low density, a water stopping polyurethane foam obtained by foaming polyurethane foam raw materials in combination of a dimer acid polyol and diphenylmethane diisocyanate (MDI) is proposed.

Further, in Patent Literature 2, in order to provide a polyurethane foam sealing material achieving both of a low density and low air permeability/high water stopping properties, formed from a polyurethane foam using a general-purpose PPG (polyoxypropylene glyceryl ether) based polyol and a MDI (diphenylmethane diisocyanate) based isocyanate, without using a special raw material system or a special additive to improve water stopping properties, a polyurethane foam sealing material having properties to achieve a water stopping pressure of 50 mm or more for a water stopping retaining time of 24 hours is provided by an appropriate blending of materials such as a general-purpose polyol and an isocyanate.

PRIOR ART DOCUMENT

Patent Literature

Patent Literature 1: JP 2009-173806 A
Patent Literature 2: JP 2002-338944 A

SUMMARY OF INVENTION

Problem to be Solved by the Invention

However, the polyurethane foam in Patent Literature 1 is expensive due to the use of a special raw material, and the water stopping properties of the sealing material in Patent Literature 2 are insufficient to satisfy the recent requirement for the higher water stopping properties of a water stopping sealing material.

Accordingly, it is an object of the present invention to provide a polyurethane foam having higher water stopping properties than conventional ones, using general-purpose raw materials.

Means for Solving the Problem

The above object is achieved by a polyurethane foam obtained by foaming and curing a composition containing a polyol component, an isocyanate component, a foam stabilizer, a cross-linking agent and a catalyst, the polyol component including a polyoxypropylene glyceryl ether-based polyol (hereinafter, referred to as a PPG based polyol) with an average molecular weight of more than 3400 and 4400 or less (wherein in the case of one polyol the average molecular weight is the number average molecular weight, and in the case of two or more polyols the average molecular weight is the sum of the number average molecular weight×mass content ratio of each of the polyols);

the isocyanate component including tolylene diisocyanate based isocyanate (hereinafter referred to as a TDI based isocyanate), a content of the isocyanate component being 40 to 50 parts by mass based on 100 parts by mass of the polyol component, the cross-linking agent including a low molecular weight polyol having 3 or more functional groups and an OH value of 1000 to 2000, a content of the cross-linking agent in the composition being 3.0 to 5.0 parts by mass based on 100 parts by mass of the polyol component; and the catalyst including a resinification catalyst and a foaming catalyst. With use of a composition including the PPG based polyol, the TDI based isocyanate and the cross-linking agent in the blending amounts mentioned above enables the foaming and curing reaction of the polyurethane foam to proceed at a proper rate, so that a polyurethane foam having high water stopping properties can be obtained.

The preferred aspects of the polyurethane foam of the present invention are as follows.

(1) The TDI based isocyanate includes 2,4-tolylene diisocyanate and/or 2,6-tolylene diisocyanate.

(2) A content of the cross-linking agent in the composition is 3.5 to 5.0 parts by mass based on 100 parts by mass of the polyol component. A polyurethane foam having higher water stopping properties can be thereby obtained.

(3) A total content of the resinification catalyst and the foaming catalyst in the composition is 1 to 4 parts by mass based on 100 parts by mass of the polyol component. With the catalysts blended in the range of amounts described above, a polyurethane foam having higher water stopping properties can be thereby obtained.

(4) A total content of the resinification catalyst and the foaming catalyst in the composition is 1 to 1.5 parts by mass based on 100 parts by mass of the polyol component. With the catalysts blended in the range of amounts described above, a uniform foaming state is obtained in foaming and curing, so that a polyurethane foam having higher water stopping properties can be obtained.

(5) The cross-linking agent has a low molecular weight polyol with 3 to 6 functional groups.

(6) The resinification catalyst and the foaming catalyst are amine catalysts.

Effects of Invention

In manufacturing of the polyurethane foam of the present invention, the use of a composition containing the PPG based polyol as polyol component, the TDI based isocyanate as isocyanate component, and the low molecular weight polyol as cross-linking agent in the blending amounts described above allows the foaming and curing reaction of the polyurethane foam to proceed at an appropriate rate, using general purpose raw materials, so that a polyurethane foam having high water stopping properties can be provided at reduced cost.

MODE FOR CARRYING OUT THE INVENTION

Figure 1:
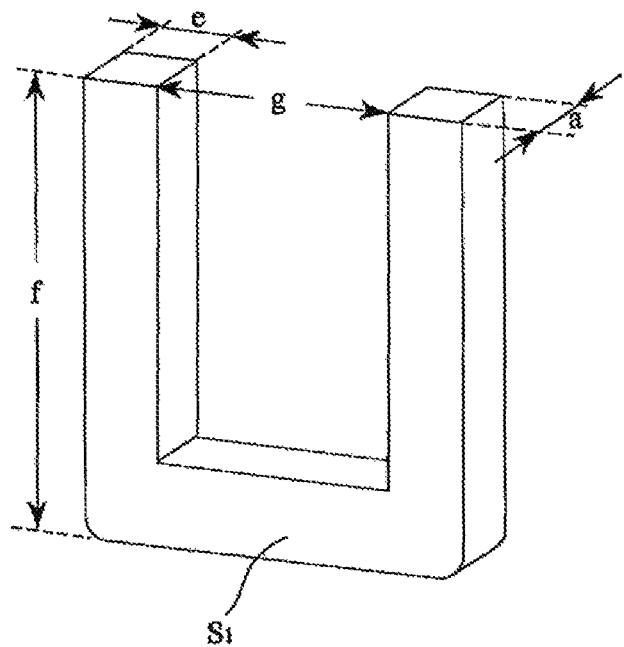
FIG. 1 is a perspective view of a U-shaped sample for use in evaluating the water stopping properties.

The polyurethane foam of the present invention is a polyurethane foam obtained by foaming and curing a composition containing at least a polyol component, an isocyanate component, a foam stabilizer, a cross-linking agent, and a catalyst. The types and the contents of the polyol component, the isocyanate component, the cross-linking agent, and the catalyst in the composition are specified. Each component is described in detail as follows.

[Polyol Component]

In the present invention, the polyol component includes a PPG based polyol having an average molecular weight of more than 3400 and 4400 or less. In the present invention, in the case of the PPG based polyol including one polyol, the "average molecular weight" of a PPG based polyol means the number average molecular weight of the polyol, and in the case of the PPG based polyol including a mixture of two or more polyols, the "average molecular weight" means the sum of the number average molecular weight×mass content ratio of each of the polyols. With a PPG based polyol having an average molecular weight in the range, a composition with an appropriate viscosity allowing a foaming and curing reaction to proceed at an appropriate rate can be obtained. The PPG based polyol means a polyol mainly composed of PPG obtained by addition polymerization of glycerin with propylene oxide. The PPG based polyol may also contain other supplemental polyols such as a polyol obtained by addition polymerization of glycerin with other alkylene oxides. The PPG based polyol is preferably a polyol containing PPG in an amount of preferably 70 mass % or more, more preferably 80 mass % or more.

The PPG based polyol has an average molecular weight of preferably 3500 to 4200, more preferably 3600 to 4000. The number average molecular weight of a PPG based polyol may be obtained, for example, from the OH value. The OH value is in accordance with JIS K 1557-1: 2007. In other words, the OH value is the number of mg of potassium hydroxide equivalent to the OH group in 1 g of a sample. The viscosity of the PPG-based polyol is preferably 500 to 700 mPa·s (25° C.), more preferably 520 to 680 mPa·s (25° C.), particularly preferably 540 to 660 mPa·s (25° C.)

As the polyol component described above, one PPG based polyol may be used or two or more PPG based polyols appropriately mixed may be used. For example, a PPG based polyol having a number average molecular weight of 3600 to 4400 (polyol A) may be used alone, or a mixture of the polyol A and a PPG based polyol having a number average molecular weight of 2700 to 3300 (polyol B) may be used with a mass ratio of the polyol B to the polyol A ([polyol B/polyol A]) in the range of: 0<[polyol B/polyol A]≤1 range. Even with a PPG based polyol having such constituents, a composition with an appropriate viscosity allowing a foaming and curing reaction to proceed at an appropriate rate can be obtained. In the case of using the polyols A and B, the number average molecular weight of the polyol A is preferably 3800 to 4200, particularly preferably 4000. The number average molecular weight of the polyol B is preferably 2850 to 3150, particularly preferably 3000. As the polyols A and B, commercially available products can be appropriately used. Examples of the polyol A include SANNIX GP-4000 (manufactured by Sanyo Chemical Industries, Ltd.). Examples of the polyol B include SANNIX GP-3000 (manufactured by Sanyo Chemical Industries, Ltd.).

[Isocyanate Component]

In the present invention, the isocyanate component includes a TDI based isocyanate. A higher polyurethane strength can be thereby obtained, so that a polyurethane foam having high water stopping properties can be obtained. The TDI based isocyanate means an isocyanate compound mainly composed of TDI. Examples of the TDI based isocyanate preferably include 2,4-tolylene diisocyanate and/or 2,6-tolylene diisocyanate. In the present invention, the content of the isocyanate component in the composition is 40 to 50 parts by mass based on 100 parts by mass of the polyol component. A polyurethane foam having a proper mechanical strength can be thereby obtained. With an isocyanate component beyond the range described above, the resulting polyurethane foam having proper mechanical strength cannot be obtained due to insufficient amount of closed-cell foams or insufficient resinification.

[Cross-Linking Agent]

In the present invention, the cross-linking agent includes a low molecular weight polyol having 3 or more functional groups and an OH value of 1000 to 2000. The above low molecular weight polyol is a cross-linking agent with high reactivity, enabling provision of a composition allowing a foaming and curing reaction to proceed at an appropriate rate. Examples of the low molecular weight polyol of the cross-linking agent include polyols such as trimethylolpropane, pentaerythritol, dipentaerythritol, and sorbitol, and polyalkylene ether polyols formed of the polyols to which ethylene oxide, propylene oxide or the like is added. The number of functional groups of the low molecular weight polyol is preferably 3 to 6. As the low molecular weight polyols, commercially available products may be appropriately used. For example, trimethylolpropane TMP (manufactured by Toyo Chemicals Co., Ltd.), and DM 82162 (manufactured by Dow Chemical Company) may be used. In the present invention, the content of the cross-linking agent in the composition is 3.0 to 5.0 parts by mass based on 100 parts by mass of the polyol component. A polyurethane foam having high water stopping properties can be thereby obtained. The content of the cross-linking agent in the composition is preferably 3.5 to 5.0 parts by mass based on 100 parts by mass of the polyol component. A polyurethane foam having high water stopping properties can be thereby obtained.

[Catalyst]

In the present invention, the catalyst includes a resinification catalyst and a foaming catalyst. As the catalyst, those known in manufacturing of polyurethane foams may be used without particular limitation. As the resinification catalyst and the foaming catalyst, amine catalysts are preferably used. The foaming amine catalyst is defined as to have an activity ratio of the foaming activity to the resinification activity (foaming activity/resinification activity) of 30/10 or more, and examples thereof include N,N,N',N",N"-pentamethyldiethylenetriamine, and bis(2-dimethylaminoethyl) ether. The resinification amine catalyst is defined as an amine catalyst having the activity ratio less than 30/10, and examples thereof include triethylenediamine, N-ethyl morpholine, and dimethylethylethanolamine. The total content of the resinification catalyst and the foaming catalyst is preferably 1 to 5 parts by mass, more preferably 1 to 1.5 parts by mass, based on 100 parts by mass of the polyol component. A more uniform foaming state can be thereby obtained in the foaming and curing reaction, so that a polyurethane foam having higher water stopping properties can be obtained.

[Foam Stabilizer]

Although the foam stabilizer is not particularly limited in the present invention, use of a reactive silicone is preferred to further improve the water stopping performance. Examples of the reactive silicones include hydroxyl group-containing reactive silicone compounds represented by the following general formulas (I) to (III). Such reactive silicones having one or more OH groups in the main chain or a side chain can be obtained by the alcohol denaturation of silicone oil. The foam stabilizer content in the composition is preferably 0.1 to 10 parts by mass, more preferably 1 to 5 parts by mass, based on 100 parts by mass of the polyol component.

[Formula 1]

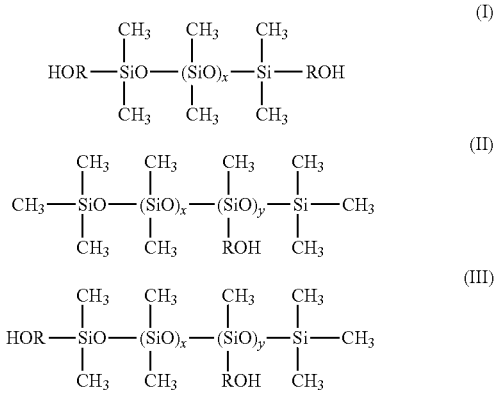

(In the formulas, R represents an alkylene group.)

[Others]

In the present invention, a foaming agent may be added to the composition on an as needed basis. Examples of the foaming agents for use include known ones such as water and methylene chloride. The foaming agent content in the composition is preferably 1 to 8 parts by mass, more preferably 2 to 5 parts by mass, based on 100 parts by mass of the polyol component. Furthermore, the composition may further contain other known additives on an as needed basis, in the range not impairing the effects of the present invention. Examples of the other additives include colorants such as pigments, fillers such as calcium carbonate, anti-oxidants, flame retardants, ultraviolet absorbers, antimicrobial agents, and antistatic agents.

[Manufacturing Method of Polyurethane Foam]

The polyurethane foam of the present invention can be manufactured by a conventional method using a composition containing the materials described above. The mixing of the composition may be performed by a conventional method such as a one-shot method and a prepolymer method.

[Water Stopping Properties]

Figure 2:
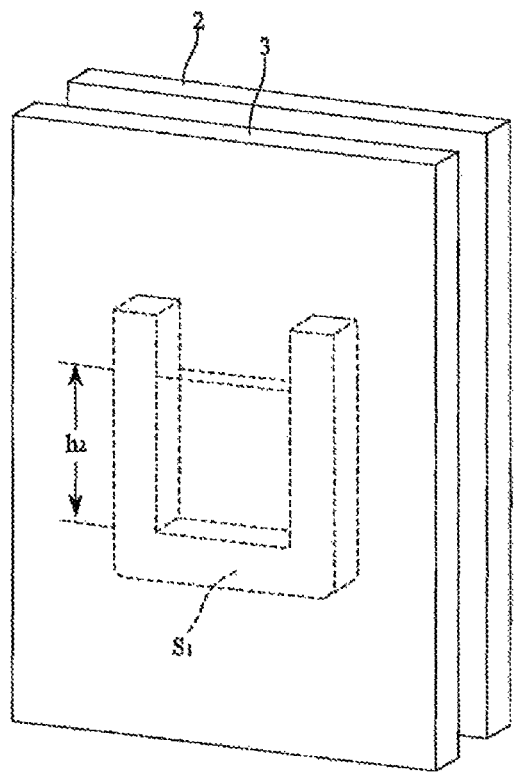
FIG. 2 is an overview of a U-shaped testing method for evaluating the water stopping properties.

In the present invention, the water stopping properties may be evaluated, for example, as follows. More specifically, a U-shaped polyurethane foam having a thickness (a) of 10 mm, a width (e) of 10 mm, a height (f) of 130 mm, and a space between both ends (g) of 45 mm as shown in FIG. 1 is held between two acrylic plates 2 and 3 in a state compressed by 50% in the thickness direction as shown in FIG. 2. The U-shaped polyurethane foam is filled with water to a predetermined height: ($h_2$) mm. In the case of detecting no water leakage for 24 hours or more, the polyurethane foam is evaluated as having a water stopping property of "($h_2$) mmaq". The polyurethane foam of the present invention has high water stopping properties, with a water stopping property of preferably 80 mmaq or more, more preferably 100 mmaq or more, in the evaluation method described above.

The polyurethane foam of the present invention can be effectively used as water stopping sealing material in the fields of automobile, housing, building, civil engineering, and consumer electronics, etc.

EXAMPLES

The present invention is described with reference to Examples as follows.

1. Preparation of Polyurethane Foam

Examples 1 to 22 and Comparative Examples 1 to 10

The materials for a polyurethane foam composition shown in tables are mixed by a one-shot method according to the formulation shown in Table 1. The mixture was foamed and cured to obtain each polyurethane foam. The description on the formulation of general components such as foaming agents and foam stabilizers is omitted.

Details on the materials for the formulation are as follows.

Polyol A: SANNIX GP-4000 (manufactured by Sanyo Chemical Industries, Ltd., PPG based polyol (number average molecular weight: 4000, viscosity: 660 mPa·s (25° C.)))

Polyol B: SANNIX GP-3000 (manufactured by Sanyo Chemical Industries, Ltd., PPG based polyol (number average molecular weight: 3000, viscosity: 500 mPa·s (25° C.)))

Isocyanate: mixture of 2,4-tolylene diisocyanate and 2,6-tolylene diisocyanate

Cross-linking agent A: DM 82162 (manufactured by Dow Chemical Company, crosslinking agent having 3 or more functional groups (OH value: 1300))

Cross-linking agent B: ACTCOL T 880 (manufactured by Mitsui Chemicals, Inc., cross-linking agent having 3 functional groups)

Resinification catalyst: DABCO 33LV (manufactured by Air Products Japan, Inc.)

Foaming catalyst: TOYOCAT ET-33B (manufactured by Tosoh Corporation)

2. Evaluation Method of Polyurethane Foam (1) Water Stopping Properties

A U-shaped sample $S_1$ having a thickness (a) of 10 mm, a width (e) of 10 mm, a height (f) of 130 mm, and a space between both ends (g) of 45 mm as shown in FIG. 1 was stamped out from each polyurethane foam. Each sample was held between two acrylic plates 2 and 3 in a state compressed by 50% in the thickness direction as shown in FIG. 2. The U-shaped polyurethane foam was filled with water to a height of 80 mm and 100 mm, and the presence of water leakage was inspected for 24 hours or more. When water leakage was detected at a height of 80 mm, the water stopping properties were defined as "X". When water leakage was not detected at a height of 80 mm but detected at a height of 100 mm, the water stopping properties were defined as "80 mmaq". When no water leakage was detected at a height of 100 mm, the water stopping properties were defined as "100 mmaq".

(2) Number of Cells

A test piece cut in the growth direction and in the horizontal direction of a polyurethane foam was observed by a stereoscopic microscope to measure the number of cells in a length of 25 mm. The average of the measurement values at 3 spots was defined as the number of cells (pieces/25 mm). Herein, a value of 50 pieces/25 mm or less was defined as "X".

(3) State of Foam

In accordance with the formation of polyurethane foams, foams communicating with each other was defined as ⊚, foams somewhat insufficiently communicating with each other was defined as ○, foams formed without communicating with each other was defined as Δ, and closed cell foams and downed foams were defined as X.

3. Evaluation Results of Polyurethane Foam

The evaluation results are described in the following tables.

TABLE 1

| | | | Comparative Example 1 | Example 1 | Example 2 | Example 3 | Example 4 | Comparative Example 2 |
|---|---|---|---|---|---|---|---|---|
| Formulation composition (parts by mass) | Polyol component | Average molecular weight | 3500 | 3500 | 3500 | 3500 | 3500 | 3500 |
| | | Polyol A | 50 | 50 | 50 | 50 | 50 | 50 |
| | | Polyol B | 50 | 50 | 50 | 50 | 50 | 50 |
| | Isocyanate | | 41.8 | 42.9 | 44.0 | 45.8 | 47.4 | 49.7 |
| | Cross-linking agent | Cross-linking agent A | 2.5 | 3.0 | 3.5 | 4.3 | 5.0 | 6.0 |
| | | Cross-linking agent B | — | — | — | — | — | — |
| | Resinification catalyst | | 0.62 | 0.62 | 0.62 | 0.62 | 0.62 | 0.62 |
| | Foaming catalyst | | 0.51 | 0.51 | 0.51 | 0.51 | 0.51 | 0.51 |
| Evaluation result | Water stopping properties [mmaq] | | X | 80 | 100 | 100 | 100 | X |
| | Number of cells [pieces/25 mm] | | X | 53 | 58 | 60 | 64 | X |

| | | | Comparative Example 3 | Example 5 | Example 6 | Example 7 | Example 8 | Comparative Example 4 |
|---|---|---|---|---|---|---|---|---|
| Formulation composition (parts by mass) | Polyol component | Average molecular weight | 3600 | 3600 | 3600 | 3600 | 3600 | 3600 |
| | | Polyol A | 60 | 60 | 60 | 60 | 60 | 60 |
| | | Polyol B | 40 | 40 | 40 | 40 | 40 | 40 |
| | Isocyanate | | 41.6 | 42.7 | 43.8 | 45.6 | 47.2 | 49.4 |
| | Cross-linking agent | Cross-linking agent A | 2.5 | 3.0 | 3.5 | 4.3 | 5.0 | 6.0 |
| | | Cross-linking agent B | — | — | — | — | — | — |
| | Resinification catalyst | | 0.62 | 0.62 | 0.62 | 0.62 | 0.62 | 0.62 |
| | Foaming catalyst | | 0.51 | 0.51 | 0.51 | 0.51 | 0.51 | 0.51 |
| Evaluation result | Water stopping properties [mmaq] | | X | 80 | 100 | 100 | 100 | X |
| | Number of cells [pieces/25 mm] | | X | 53 | 58 | 60 | 63 | X |

TABLE 2

| | | | Comparative Example 5 | Example 9 | Example 10 | Example 11 | Example 12 | Comparative Example 6 | Comparative Example 7 |
|---|---|---|---|---|---|---|---|---|---|
| Formulation composition (parts by mass) | Polyol component | Average molecular weight | 3700 | 3700 | 3700 | 3700 | 3700 | 3700 | 3700 |
| | | Polyol A | 70 | 70 | 70 | 70 | 70 | 70 | 70 |
| | | Polyol B | 30 | 30 | 30 | 30 | 30 | 30 | 30 |
| | Isocyanate | | 41.3 | 42.4 | 43.6 | 45.4 | 46.9 | 49.2 | 46.4 |
| | Cross-linking agent | Cross-linking agent A | 2.5 | 3.0 | 3.5 | 4.3 | 5.0 | 6.0 | — |
| | | Cross-linking agent B | — | — | — | — | — | — | 3.5 |

TABLE 2-continued

|  |  | Resinification catalyst | 0.62 | 0.62 | 0.62 | 0.62 | 0.62 | 0.62 | 0.62 |
|---|---|---|---|---|---|---|---|---|---|
|  |  | Foaming catalyst | 0.51 | 0.51 | 0.51 | 0.51 | 0.51 | 0.51 | 0.51 |
| Evaluation result |  | Water stopping properties [mmaq] | X | 80 | 100 | 100 | 100 | X | X |
|  |  | Number of cells [pieces/25 mm] | X | 51 | 58 | 60 | 65 | X | X |

|  |  |  | Comparative Example 8 | Example 13 | Example 14 | Example 15 | Example 16 | Comparative Example 9 | Comparative Example 10 |
|---|---|---|---|---|---|---|---|---|---|
| Formulation composition (parts by mass) | Polyol component | Average molecular weight | 4000 | 4000 | 4000 | 4000 | 4000 | 4000 | 3400 |
|  |  | Polyol A | 100 | 100 | 100 | 100 | 100 | 100 | 40 |
|  |  | Polyol B | 0 | 0 | 0 | 0 | 0 | 0 | 60 |
|  | Isocyanate |  | 40.6 | 41.7 | 42.8 | 44.6 | 46.2 | 48.5 | 47.8 |
|  | Cross-linking agent | Cross-linking agent A | 2.5 | 3.0 | 3.5 | 4.3 | 5.0 | 6.0 | 4.3 |
|  |  | Cross-linking agent B | — | — | — | — | — | — | — |
|  | Resinification catalyst |  | 0.62 | 0.62 | 0.62 | 0.62 | 0.62 | 0.62 | 0.62 |
|  | Foaming catalyst |  | 0.51 | 0.51 | 0.51 | 0.51 | 0.51 | 0.51 | 0.51 |
| Evaluation result |  | Water stopping properties [mmaq] | X | 80 | 100 | 100 | X | X | X |
|  |  | Number of cells [pieces/25 mm] | X | 53 | 58 | 60 | X | X | X |

TABLE 3

|  |  |  | Example 17 | Example 18 | Example 19 | Example 20 | Example 21 | Example 22 |
|---|---|---|---|---|---|---|---|---|
| Formulation composition (parts by mass) | Polyol component | Average molecular weight | 3700 | 3700 | 3700 | 3700 | 3700 | 3700 |
|  |  | Polyol A | 70 | 70 | 70 | 70 | 70 | 70 |
|  |  | Polyol B | 30 | 30 | 30 | 30 | 30 | 30 |
|  | Isocyanate |  | 45.4 | 45.4 | 45.4 | 45.4 | 45.4 | 45.4 |
|  | Cross-linking agent | Cross-linking agent A | 4.3 | 4.3 | 4.3 | 4.3 | 4.3 | 4.3 |
|  |  | Cross-linking agent B | — | — | — | — | — | — |
|  | Resinification catalyst |  | 0.36 | 0.18 | 0.18 | 0.51 | 0.51 | 0.80 |
|  | Foaming catalyst |  | 0.46 | 0.69 | 0.82 | 0.58 | 0.62 | 0.69 |
|  | Total content of catalysts |  | 0.82 | 0.87 | 1.00 | 1.09 | 1.13 | 1.49 |
| Evaluation result |  | Water stopping properties [mmaq] | 80 | 80 | 100 | 100 | 100 | 100 |
|  |  | Number of cells [pieces/25 mm] | 60 | 60 | 60 | 60 | 60 | 60 |
|  |  | Foaming state | Δ | Δ | ○ | ⊚ | ⊚ | ○ |

As shown in the tables, the polyurethane foams in Examples 1 to 22 prepared from the composition containing a polyol component, an isocyanate component, a cross-linking agent and a catalyst had excellent water stopping properties; the polyol component including a PPG based polyol with an average molecular weight of more than 3400 and 4400 or less (polyol prepared from a PPG based polyol having a number average molecular weight of 4000 as polyol A and a PPG based polyol having a number average molecular weight of 3000 as polyol B); the isocyanate component including a TDI based isocyanate with a content of 40 to 50 parts by mass based on 100 parts by mass of the polyol component; the cross-linking agent including a low molecular weight polyol having 3 or more functional groups and an OH value of 1300, with a content of 3.0 to 5.0 parts by mass based on 100 parts by mass of the polyol component; and the catalyst including a resinification catalyst and a foaming catalyst. The polyurethane foams with a small amount of a cross-linking agent in Comparative Examples 1, 3, 5 and 8, and the polyurethane foams with a large amount of a cross-linking agent in Comparative Examples 2, 4, 6 and 9 had insufficient water stopping properties. Further, the polyurethane foam including a cross-linking agent having 3 functional groups in Comparative Example 7 and the polyurethane foam including a PPG based polyol having an average molecular weight of 3400 in Comparative Example 10 had insufficient water stopping properties.

In Examples 17 to 22, the catalyst content was changed to evaluate the state of foams. As a result, the polyurethane foams in Examples 19 to 22 obtained from the compositions with a total content of a resinification catalyst and a foaming catalyst in the range of 1 to 1.5 parts by mass based on 100 parts by mass of the polyol component had a particularly good state of foams, with excellent water stopping properties.

The present invention is not limited to the construction of the embodiments and Examples, and the various modifications may be made within the scope of the invention.

INDUSTRIAL APPLICABILITY

The present invention can provide a polyurethane foam having high water stopping properties at low cost, using general purpose raw materials.

REFERENCE SIGN LIST $S_1$: U-shaped sample
2 and 3: Acrylic plates

What is claimed is:

1. A polyurethane foam for a water stopping sealing material obtained by foaming and curing a composition containing a polyol component, an isocyanate component, a foam stabilizer, a cross-linking agent, and a catalyst,
    the polyol component comprising a polyoxypropylene glyceryl ether-based polyol with an average molecular weight of more than 3400 and 4400 or less (wherein in the case of one polyol the average molecular weight is the number average molecular weight, and in the case of two or more polyols the average molecular weight is the sum of the number average molecular weight×mass content ratio of each of the polyols);
    the isocyanate component comprising a tolylene diisocyanate (TDI) based isocyanate, a content of the isocyanate component being 40 to 50 parts by mass based on 100 parts by mass of the polyol component;
    the cross-linking agent comprising a low molecular weight polyol having 3 or more functional groups and an OH value of 1000 to 2000, a content of the cross-linking agent in the composition being 3.0 to 5.0 parts by mass based on 100 parts by mass of the polyol component; and
    the catalyst comprising a resinification catalyst and a foaming catalyst,
    a total content of the resinification catalyst and the foaming catalyst in the composition being 1 to 1.5 parts by mass based on 100 parts by mass of the polyol component, wherein
    the resinification catalyst and the foaming catalyst are amine catalysts,
    a content of the resinification catalyst is in a range of 0.18 to 0.62 parts by mass based on 100 parts by mass of the polyol component, and
    a content of the foaming catalyst is in a range of 0.46 to 0.82 parts by mass based on 100 parts by mass of the polyol component.

2. The polyurethane foam according to claim 1, wherein the TDI based isocyanate comprises 2,4-tolylene diisocyanate and/or 2,6-tolylene diisocyanate.

3. The polyurethane foam according to claim 1, wherein a content of the cross-linking agent in the composition is 3.5 to 5.0 parts by mass based on 100 parts by mass of the polyol component.

4. The polyurethane foam according to claim 1, wherein the cross-linking agent has a low molecular weight polyol with 3 to 6 functional groups.

* * * * *